United States Patent
Tally et al.

(10) Patent No.: US 9,548,598 B2
(45) Date of Patent: Jan. 17, 2017

(54) CABLE MANAGEMENT FITTING

(71) Applicant: Cooper Technologies Company, Houston, TX (US)

(72) Inventors: Brandon Michael Tally, Greenville, IL (US); Stephen Nathaniel Thompson, Edwardsville, IL (US); James A. Knutson, Collinsville, IL (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 14/340,112

(22) Filed: Jul. 24, 2014

(65) Prior Publication Data

US 2016/0025244 A1 Jan. 28, 2016

(51) Int. Cl.
*F16L 3/24* (2006.01)
*H02G 3/32* (2006.01)
*H02G 3/04* (2006.01)

(52) U.S. Cl.
CPC .............. *H02G 3/32* (2013.01); *H02G 3/0456* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,216,685 A * | 11/1965 | Raymond | ..................... | 248/74.2 |
| 3,228,640 A * | 1/1966 | Wolsh | ....................... | F16L 3/00 24/339 |
| 3,612,461 A * | 10/1971 | Brown | ...................... | E04B 9/18 248/317 |
| 3,894,707 A * | 7/1975 | Heard | ........................ | 248/230.9 |
| 4,524,937 A * | 6/1985 | Zizan | ............................ | 248/74.3 |
| 4,542,871 A * | 9/1985 | Fortsch | ........................... | 248/73 |
| 4,638,966 A * | 1/1987 | Ford | ............................... | 248/62 |
| 4,723,749 A * | 2/1988 | Carraro | ..................... | E04B 9/18 24/336 |
| 4,779,828 A * | 10/1988 | Munch | ..................... | H02G 3/32 24/16 PB |
| 5,076,035 A * | 12/1991 | Wright | ............................ | 52/464 |
| 5,135,188 A * | 8/1992 | Anderson et al. | ............ | 248/74.3 |
| 5,271,585 A * | 12/1993 | Zetena, Jr. | ...................... | 248/49 |
| 5,409,198 A * | 4/1995 | Roick | ..................... | A47C 31/06 24/336 |
| 5,435,506 A * | 7/1995 | Wiley | ........................... | 248/74.1 |
| 5,463,189 A * | 10/1995 | Deneke | ..................... | H02G 3/26 174/138 G |
| 5,595,363 A * | 1/1997 | De Leebeeck | ............. | F16L 3/24 248/72 |
| 5,639,048 A * | 6/1997 | Bartholomew | ............ | F16L 3/26 248/49 |
| 5,740,994 A * | 4/1998 | Laughlin | ...................... | 248/68.1 |

(Continued)

OTHER PUBLICATIONS

B-Line by Eaton; Redi-Rail™ Accessories, Barrier Strip Clip, at east as early as Jul. 23, 2014, 1 page.

*Primary Examiner* — Monica Millner
(74) *Attorney, Agent, or Firm* — Senniger Powers LLP (57) ABSTRACT

A cable management attachment fitting for a ladder-type cable tray includes a rung attachment portion configured to attach to a lower flange of a rung of the ladder-type cable tray without the use of an additional fastener. A cable management attachment portion extends upward from the rung attachment portion and is configured to provide a structure to which a cable management device can be secured.

11 Claims, 11 Drawing Sheets

(56) References Cited

U.S. PATENT DOCUMENTS

| | | | | |
|---|---|---|---|---|
| 5,941,483 | A * | 8/1999 | Baginski | F16L 3/22 248/68.1 |
| 6,027,091 | A * | 2/2000 | Johnson | 248/340 |
| 6,129,316 | A * | 10/2000 | Bauer | H04Q 1/09 248/49 |
| 6,170,784 | B1 * | 1/2001 | MacDonald | H05K 7/1448 211/26 |
| 6,364,257 | B1 * | 4/2002 | Holder | 248/74.3 |
| 6,378,814 | B1 * | 4/2002 | Kaplan | H02G 3/30 248/71 |
| 6,484,365 | B1 * | 11/2002 | Thompson | B60J 3/0204 224/312 |
| 6,550,723 | B2 * | 4/2003 | Fraley et al. | 248/74.3 |
| 6,643,900 | B2 * | 11/2003 | Jahrling | A47B 55/02 24/336 |
| 6,672,547 | B1 * | 1/2004 | Westerberg et al. | 248/74.1 |
| 6,685,144 | B1 * | 2/2004 | Wochnick | 248/73 |
| 6,691,382 | B1 * | 2/2004 | Su | B65D 7/20 24/335 |
| 7,360,744 | B2 * | 4/2008 | Kwilosz | 248/74.3 |
| 7,506,845 | B2 * | 3/2009 | Oh | F16L 3/24 248/72 |
| 7,621,487 | B2 * | 11/2009 | Brown et al. | 248/65 |
| 7,743,931 | B2 * | 6/2010 | Barkdoll | 211/7 |
| 7,766,292 | B2 * | 8/2010 | Liebendorfer | 248/237 |
| 7,909,420 | B2 * | 3/2011 | Jahrling | A47L 15/504 211/41.8 |
| 8,020,811 | B2 * | 9/2011 | Nelson | F16L 3/2235 174/68.1 |
| 8,157,235 | B2 * | 4/2012 | Quertelet et al. | 248/339 |
| 8,480,041 | B2 * | 7/2013 | Myers | F16L 3/1211 24/16 R |
| 8,523,112 | B2 * | 9/2013 | Holvoet et al. | 244/131 |
| 8,540,191 | B2 * | 9/2013 | Sabadie et al. | 244/131 |
| 8,622,347 | B2 * | 1/2014 | Oyzerskiy | 244/131 |
| 8,745,935 | B2 * | 6/2014 | DuPont et al. | 52/173.3 |
| 8,894,033 | B2 * | 11/2014 | Hartelius et al. | 248/500 |
| 9,309,719 | B2 * | 4/2016 | Sylvester | E06C 7/14 |
| 9,350,147 | B2 * | 5/2016 | Tally | H02G 3/0608 |
| 2005/0082431 | A1 * | 4/2005 | Scown et al. | 244/119 |
| 2007/0257158 | A1 * | 11/2007 | Caveney et al. | 248/72 |
| 2007/0290100 | A1 * | 12/2007 | Caveney | H02G 3/0437 248/74.3 |
| 2009/0026327 | A1 * | 1/2009 | Zeuner et al. | 248/72 |
| 2011/0073718 | A1 * | 3/2011 | Whipple et al. | 248/58 |
| 2012/0192925 | A1 * | 8/2012 | Grushkowitz et al. | 136/251 |
| 2014/0014163 | A1 * | 1/2014 | McCarthy et al. | 136/251 |
| 2014/0061396 | A1 * | 3/2014 | Magno et al. | 248/72 |
| 2014/0259566 | A1 * | 9/2014 | Rouleau et al. | 24/457 |
| 2015/0114683 | A1 * | 4/2015 | O'Regan et al. | 174/174 |

* cited by examiner

CABLE MANAGEMENT FITTING

FIELD OF THE DISCLOSURE

The present disclosure generally relates to a cable management fitting for use in securing a cable management device to a cable tray, and a cable tray including the same.

BACKGROUND OF THE DISCLOSURE

Ladder-type cable tray is used by industry to support electrical cable. A length or section of ladder cable tray comprises a pair of side rails connected by cable-supporting rungs extending between the rails at intervals along the tray. Cable tray sections are spliced together using splice plates to form a cable tray run.

SUMMARY OF THE DISCLOSURE

In one aspect, a cable management attachment fitting for a ladder-type cable tray generally comprises a rung attachment portion configured to attach to a lower flange of a rung of the ladder-type cable tray without the use of an additional fastener. A cable management attachment portion extends upward from the rung attachment portion and is configured to provide a structure to which a cable management device can be secured.

In another aspect, a cable tray assembly generally comprises two parallel rails forming sides of the cable tray assembly. Rungs are connected to and extend between the two parallel rails. Each rung includes a vertical body having upper and lower ends, and a lower flange at the lower end of the vertical body. A cable management attachment fitting is secured to one of the rungs and includes a rung attachment portion attached to a lower flange of a rung of the ladder-type cable tray without the use of an additional fastener. A cable management attachment portion extends upward from the rung attachment portion and is configured to provide a structure to which a cable management device can be secured.

In yet another aspect, a method of attaching a cable management attachment fitting to a ladder-type cable tray generally comprises providing a cable management fitting including a rung attachment portion configured to attach to a lower flange of a rung of the ladder-type cable tray without the use of an additional fastener, and a cable management attachment portion extending upward from the rung attachment portion and configured to provide a structure to which a cable management device can be secured. The rung attachment portion is attached to a lower flange of a rung of a ladder-type cable tray without the use of an additional fastener, such that the cable management attachment portion is adjacent an upper end of the rung.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE DRAWINGS

Figure 1:
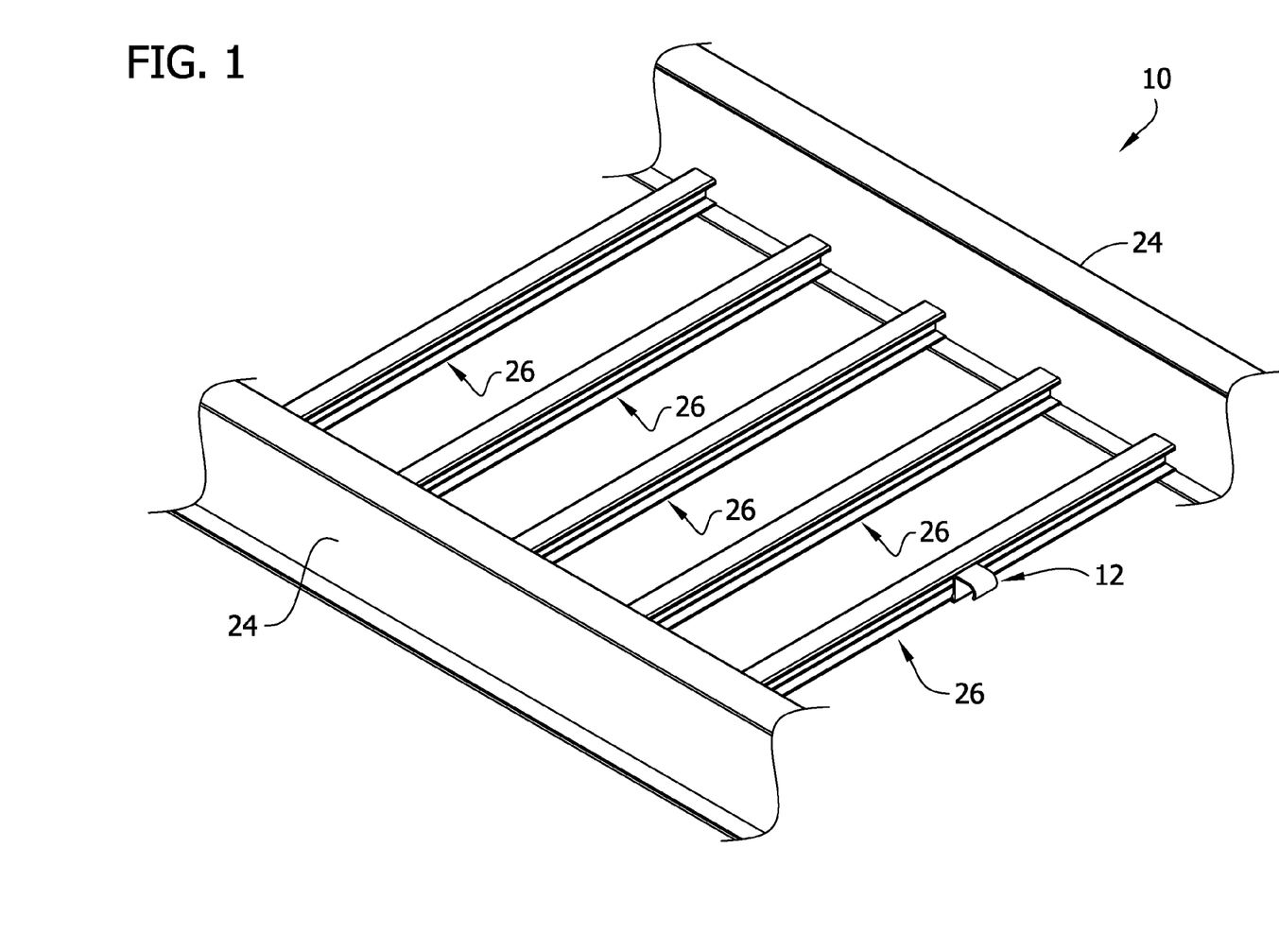
FIG. 1 is a fragmentary perspective of a ladder cable tray section including an embodiment of a cable management fitting secured to a rung of the ladder cable tray section.

FIG. 1 illustrates a ladder cable tray section 10 including a cable management fitting, generally indicated at 12, secured thereto for use in securing a cable management device to the cable tray section. The illustrated cable tray section 10 is of a conventional design and configuration, although the cable tray section may be of other configurations. As is generally known in the art, two or more of the cable tray sections 10 may be connected to one another by splice plates (not shown) to form a run of a cable tray having a desired length. The length of the cable tray section 10 may vary (e.g., from 10-30 feet), and sections are often cut to varying lengths in the field.

The illustrated cable tray section 10 includes two parallel rails 24 forming the sides of the cable tray section, and a plurality of cable-supporting rungs, each generally indicated at 26, connected to and extending between the rails 24 at intervals spaced lengthwise of the section. Accordingly, the rails 24 extend along the length of the cable tray section 10, and the rungs 26 extends generally transverse or cross-wise to the length of the cable tray section. The rungs 26 are secured to the rails 24 such as by welding or suitable fasteners. In one example, each of the rails 24 and rungs 26 may be a single, integrally formed component. Each rail 24 and rung 26 may be formed by a suitable manufacturing process and may comprise any suitable material. By way of example, the rails 24 and rungs 26 may be made from fiberglass. On the other hand, the rails 24 and rungs 26 may be made from heavy-gage metal, for example, extruded aluminum, or it may be sheet steel bent into the shape of the respective rail and rung. Other ways of forming the rails 24 and rungs 26 do not depart from the scope of the present invention.

Figure 2:
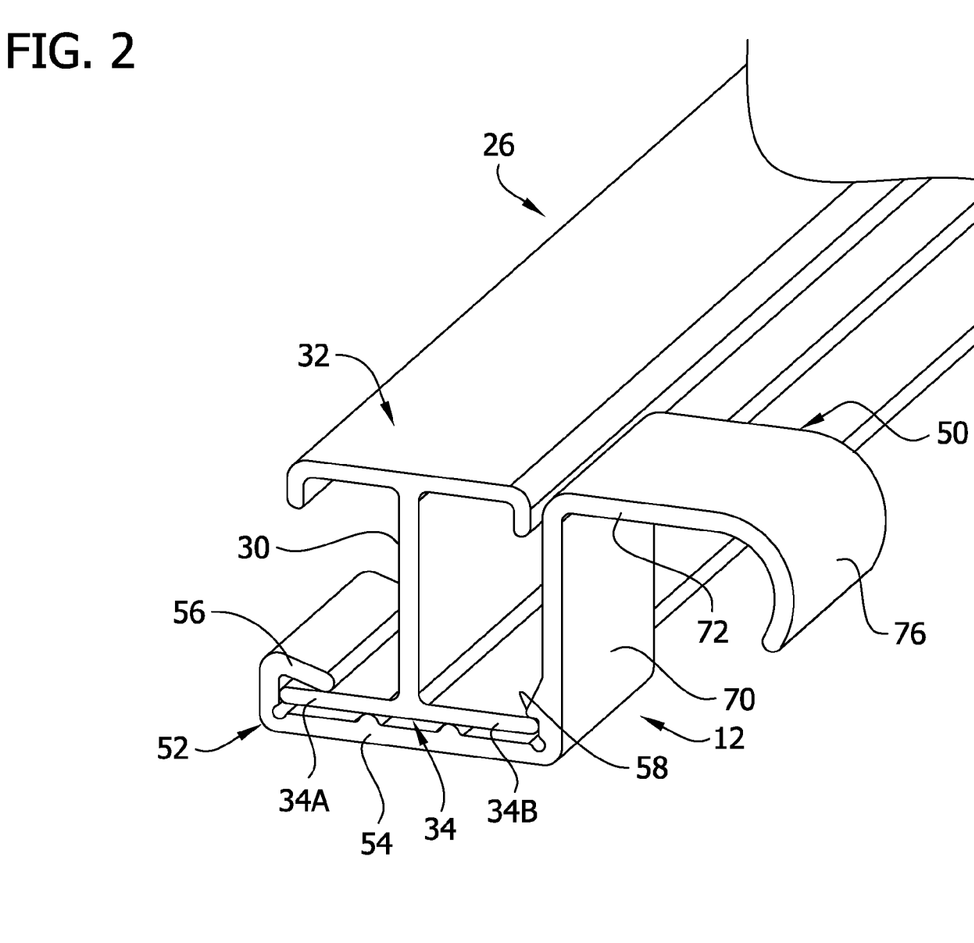
FIG. 2 is an enlarged, fragmentary perspective of a rung and the cable management fitting secured thereto.
Figure 3:
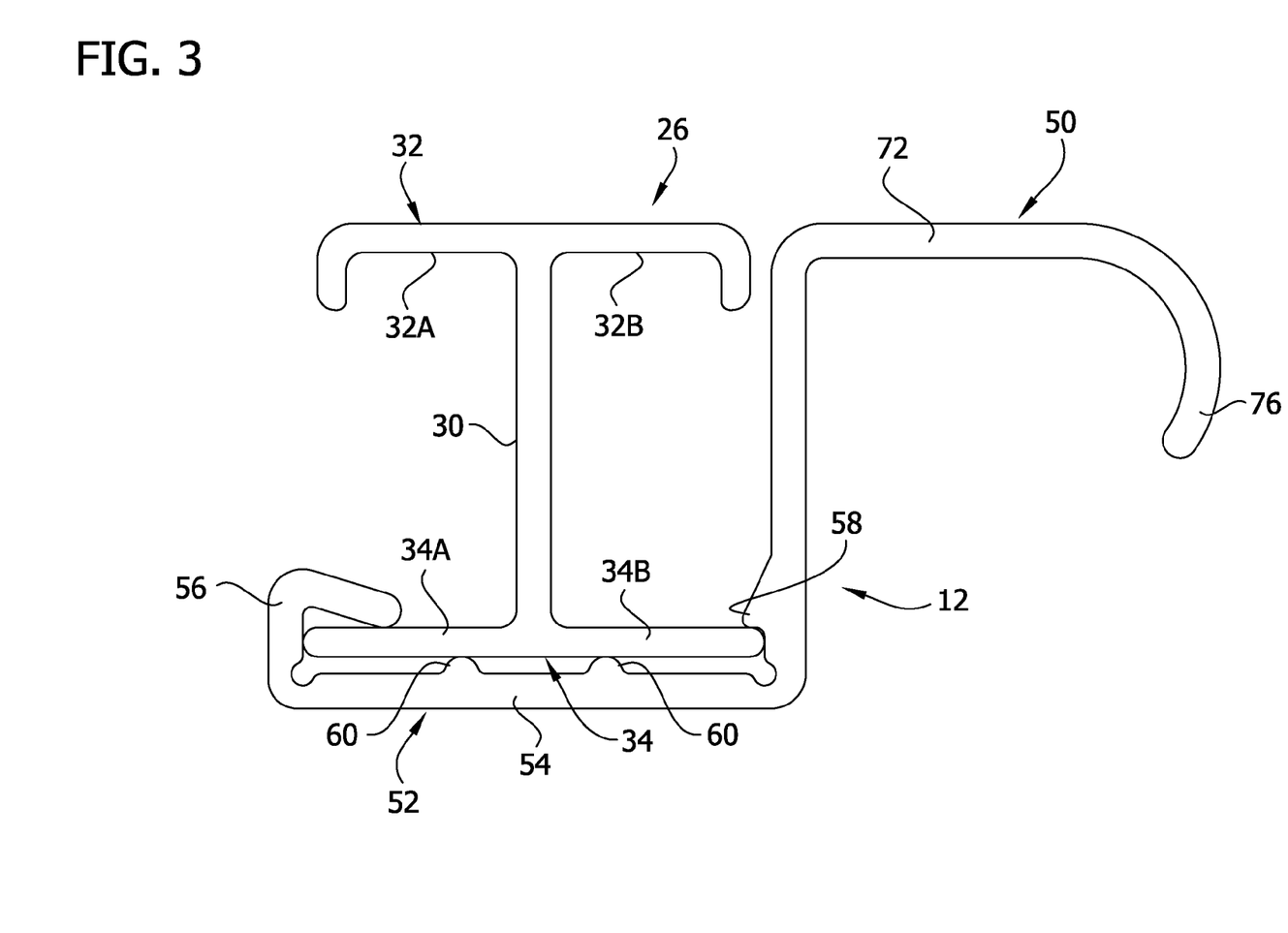
FIG. 3 is a side elevation of FIG. 2.

Referring to FIGS. 2 and 3, each rung 26 comprises a generally vertical web 30, a generally horizontal upper flange, generally indicated at 32, at the upper end of the web, and a generally horizontal lower flange, generally indicated at 34, at the lower end of the web. As shown in FIG. 3, each of the upper and lower flanges 32, 34 includes an upstream portion 32A, 34A, respectively, extending upstream from the vertical web 30, and a downstream portion 32B, 34B, respectively, extending downstream from the vertical web. Together, the upstream and downstream lower flange portions 34A, 34B constitute a lower flange of the rung 26, as used herein. In other embodiments, each rung may include a body having a generally inverted U-shape in cross section, and spaced apart upstream and downstream lower flange portions. Each rung 26 may be of other designs and configurations.

Figure 4:
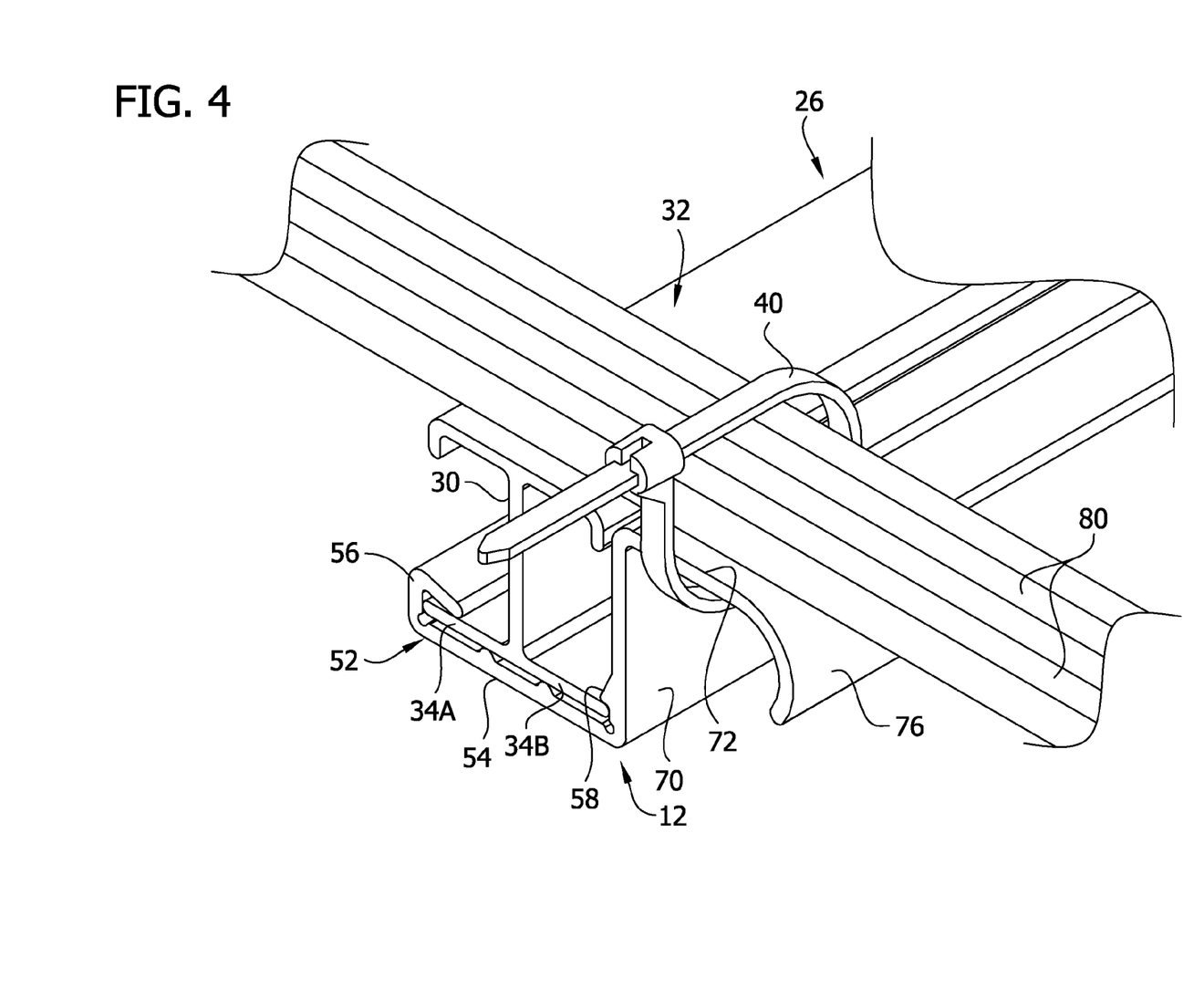
FIG. 4 is similar to FIG. 2, including cables supported by the rung and secured to the cable management fitting.
Figure 5:
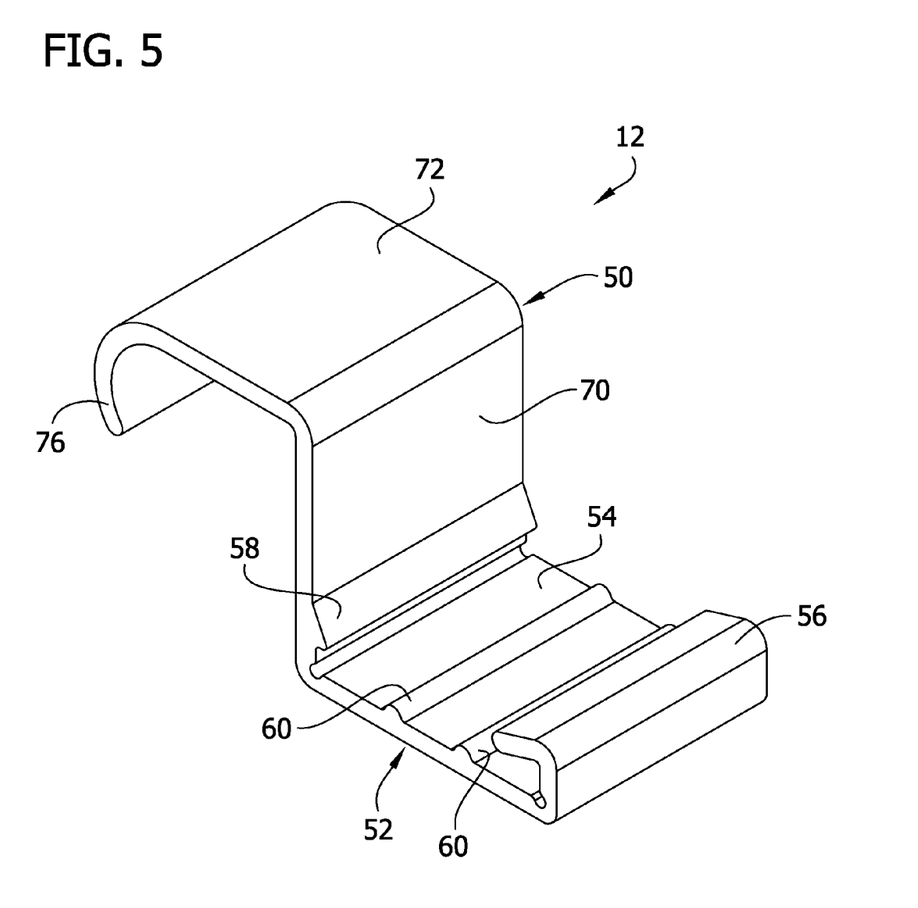
FIG. 5 is an enlarged perspective of the cable management fitting.
Figure 6:
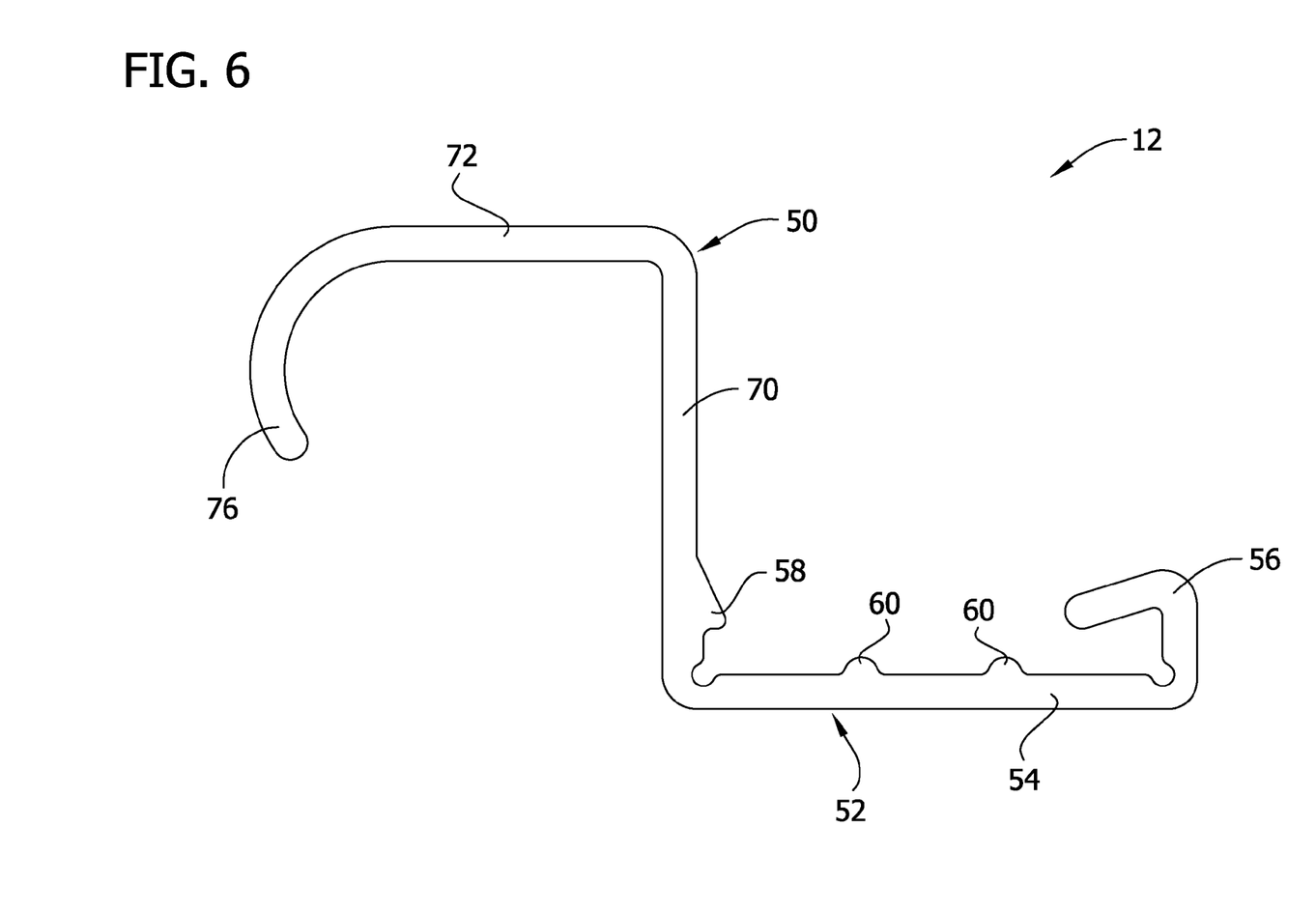
FIG. 6 is a front elevation of the cable management fitting of FIG. 5.

Referring to FIG. 4, the cable management fitting 12 is configured for attachment to any one of the rungs 26, without the use of an additional fastener, to provide a structure to which a cable management device 40 (e.g., a tie wrap, banding, a hook and loop fastener, and/or a barrier strip) can be secured. The cable management fitting 12 comprises a rung attachment portion, generally indicated at 52, and a cable management attachment portion, generally indicated at 50. The cable management fitting 12 may be a single, integrally formed component, and may be formed from any suitable material by a suitable manufacturing process. By way of example, the cable management fitting 12 may be formed from plastic and resiliently deflectable. On the other hand, the cable management fitting 12 may be formed from metal, for example, extruded aluminum, or it may be sheet steel bent into the shape of the fitting. Other ways of forming the cable management fitting do not depart from the scope of the present invention.

Figure 7:
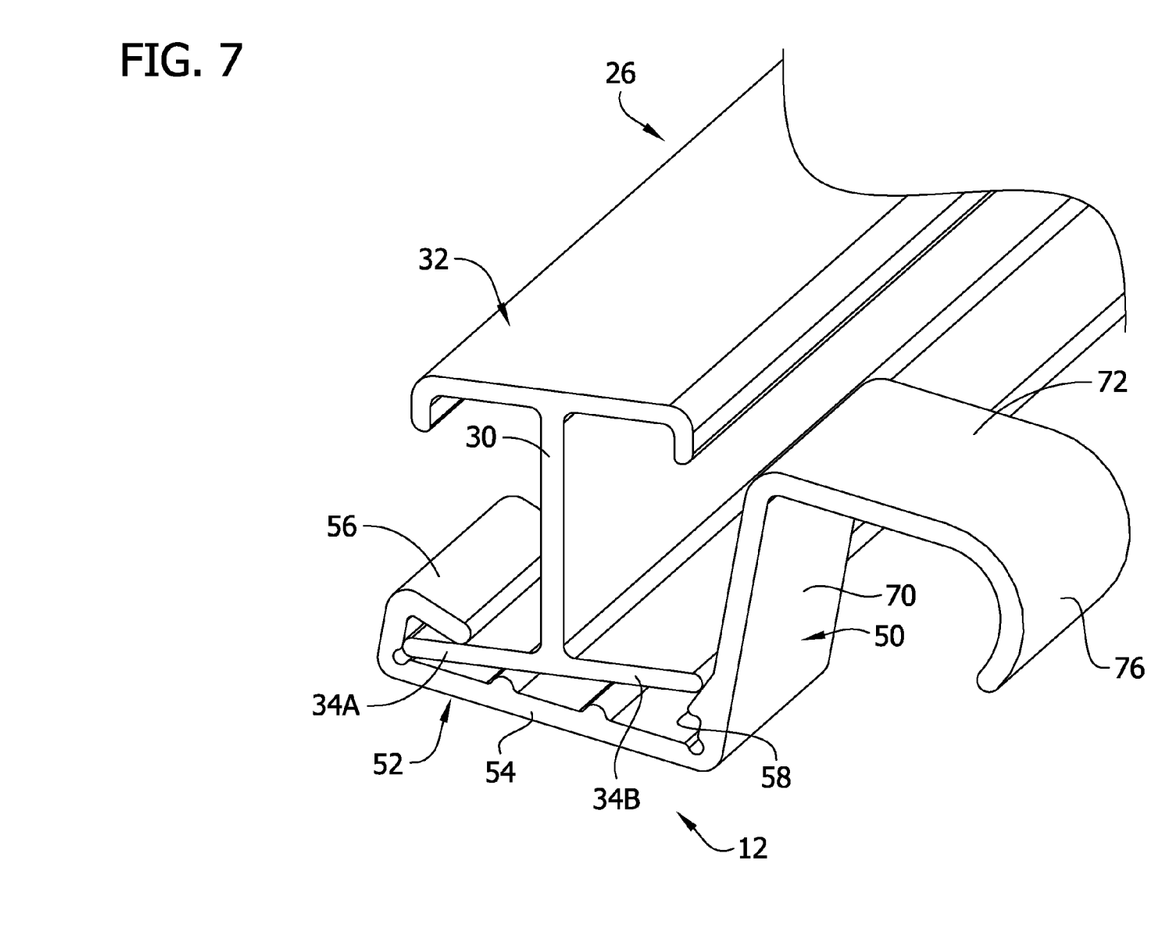
FIG. 7 is an enlarged, fragmentary perspective of a rung showing the cable management fitting being secured thereto.
Figure 8:
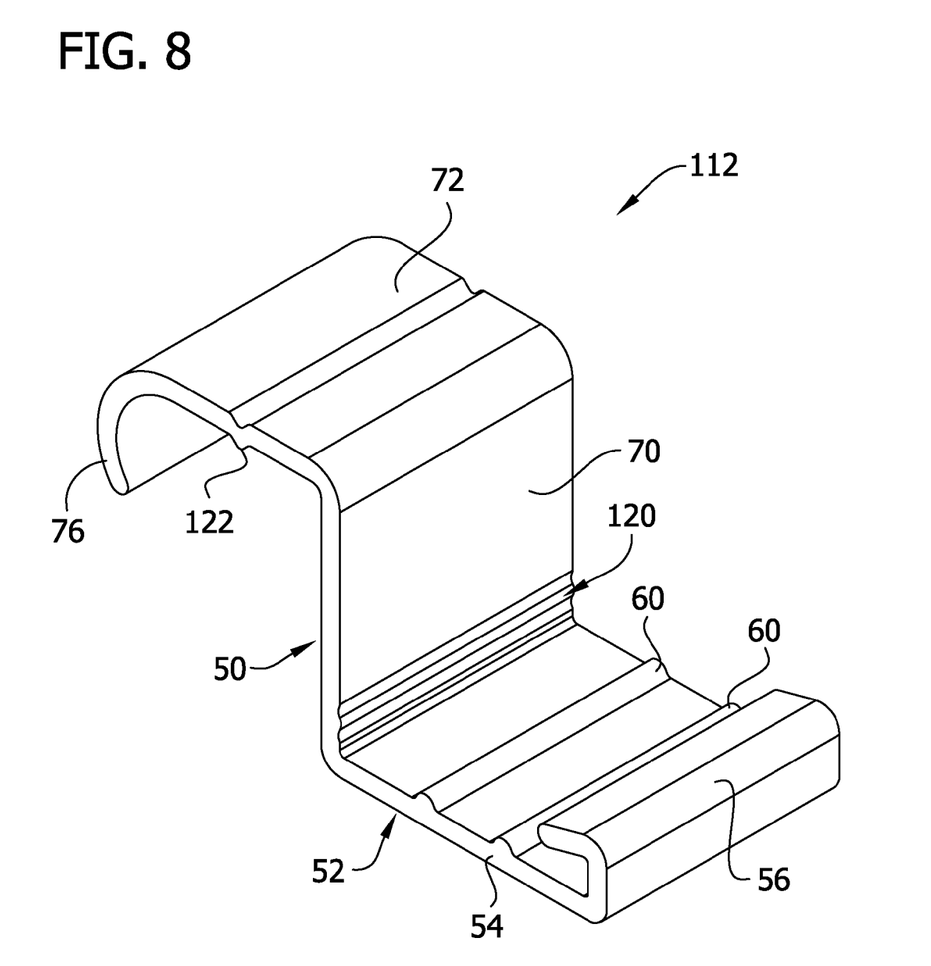
FIG. 8 is an enlarged perspective of another embodiment of the cable management fitting.
Figure 9:
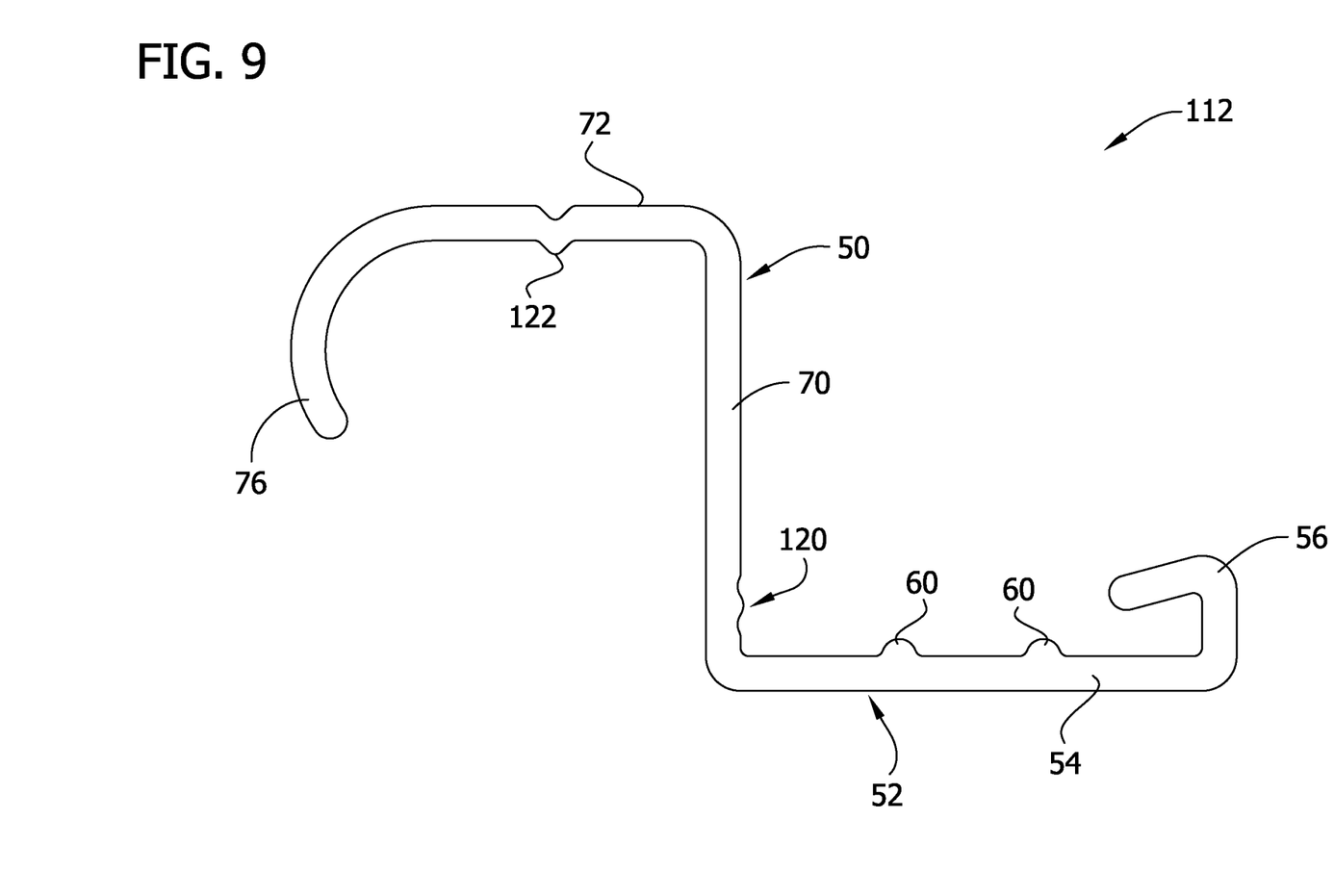
FIG. 9 is a front elevation of the cable management fitting of FIG. 8.
Figure 10:
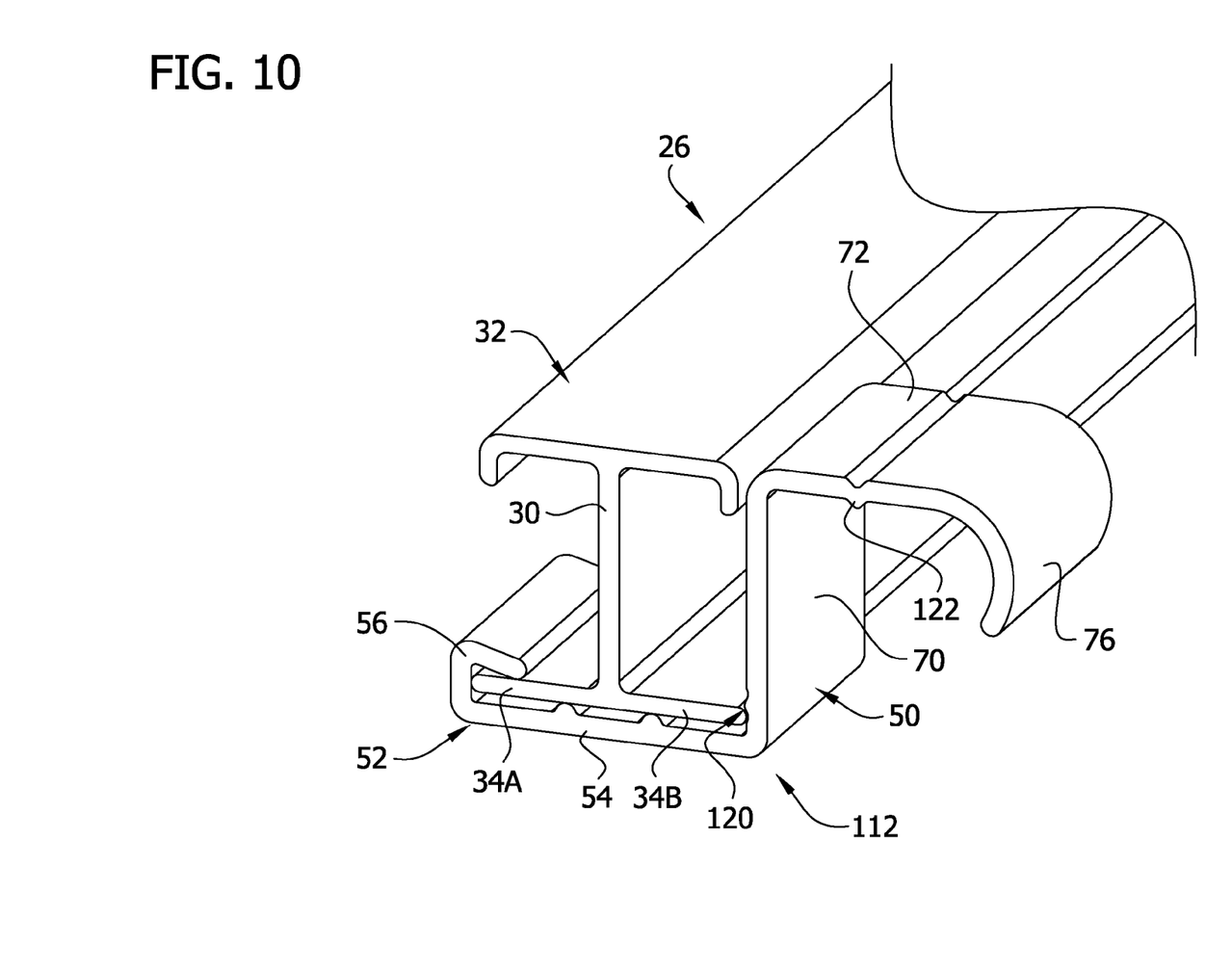
FIG. 10 is an enlarged, fragmentary perspective of a rung and the cable management fitting of FIG. 8 secured thereto.
Figure 11:
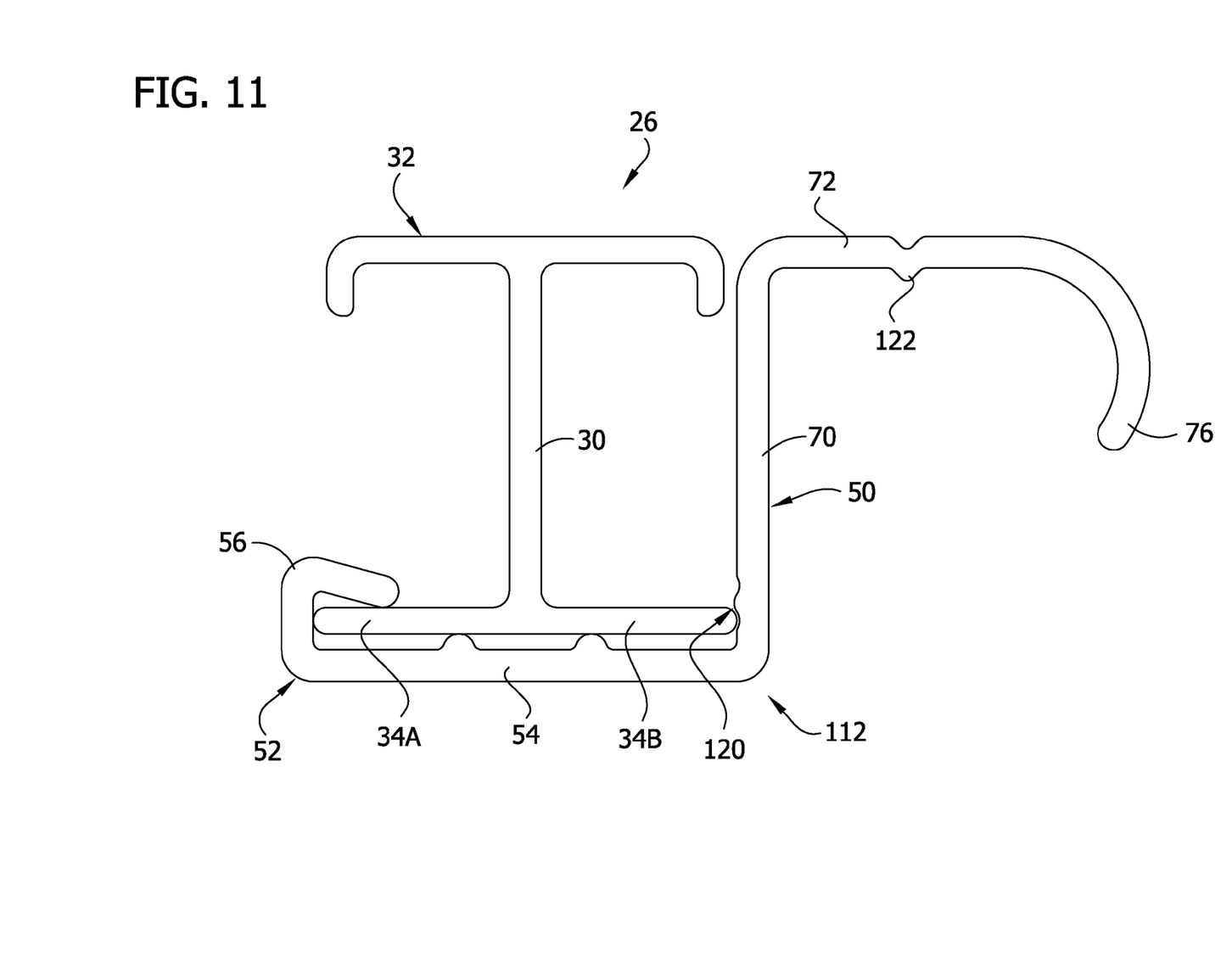
FIG. 11 is a side elevation of FIG. 10.

The illustrated rung attachment portion 52 of the cable management fitting 12 is configured to attach to the corresponding rung 26 without the use of additional fasteners. For example, the illustrated rung attachment portion 52 is configured to clip onto to the lower flange 34 corresponding rung 26, such as by way of a snap-fit or interference fit, for example. It is understood that the rung attachment portion 52 may be configured to attach to a different part of the rung 26 without the use of additional fasteners and/or may be configured to attach to the rung in other ways without departing from the scope of the present invention. In the illustrated embodiment, the rung attachment portion 52 is in the form of a clip including a base 54 having opposite first and second ends, a hook member 56 at the first end of the base, and a detent or latch 58 at the second end of the base. As shown in FIGS. 2, 3 and 7, the hook member 56 is configured to hook onto (broadly, configured to attach to) a terminal end margin of the lower flange 34, and more specifically, to either one of the downstream and upstream portions 34A, 34B of the lower flange. Referring to FIG. 7, with the hook member 56 secured to the lower flange 34, the base 54 is generally in opposing, face-to-face relationship with the lower surface of the lower flange. The second end of the base 54, including the latch 58, can be pivoted upward toward the lower flange 34 (e.g., toward the other of the downstream and upstream portions 34A, 34B) about the first end of the base that is attached to the lower flange via the hook member 56. As the second end of the base 54 is moved upward, the rung attachment portion 52 (e.g., the base 54 and/or the hook member 56 and/or the latch 58) resiliently deflects to allow the latch 58 to pass over a corresponding terminal end of the lower flange 34 (i.e., to move from the lower side to an upper side of the lower flange). As the latch 58 moves past the corresponding terminal end of the lower flange 34, the rung attachment portion 52 rebounds toward its initial, unloaded configuration to snap or clip (broadly, attach) the rung attachment portion on the lower flange. When the rung attachment portion 52 is secured to the corresponding rung 26, the hook member 56 engages the terminal edge margin of one of the downstream and upstream portions 34A, 34B (e.g., the downstream portion) of the lower flange 34, the base 54 (e.g., ribs 60 of the base) engages the lower surface of the lower flange, and the latch 58 engages an upper surface of the corresponding terminal edge margin of the lower flange. In this position, the rung attachment portion 52 is secured to the rung 26 without the use of an additional fastener, such as a screw or bolt.

The cable management attachment portion 50 of the cable management fitting 12 includes a vertical arm 70 extending upward from the latch 58, and a cable attachment flange, generally indicated at 72, extending laterally outward at an upper end of the arm. The length of the vertical arm 70 is such that when the cable management fitting 12 is attached to the corresponding rung 26, an upper surface of the cable attachment flange 72 is generally coplanar with the upper surface of the upper flange 32 of the rung, as shown in FIG. 3, for example. Moreover, the upper surface of the cable attachment flange 72 is generally flat or planar and generally adjacent to the upper surface of the upper flange 32 of the corresponding rung 26 such that the cable attachment flange effectively functions as an extension of the upper flange. In the illustrated embodiment, an inturned lip or return flange 76 in the shape of a hook is provided at the terminal end of the cable attachment flange 72 such that the cable attachment flange and the inturned lip together have a generally J-shaped cross section. As shown in FIG. 4, the cable attachment flange 72 provides a structure to which the cable management device 40 can be secured. For example, in FIG. 4 the cable management device 40 comprises a cable tie. In this example, cables 80 (e.g., a bundle of cables) are supported on the cable attachment flange 72 and the cable tie 40 is wrapped around the cables and the underside of the cable attachment flange to secure the cables to the flange. The inturned lip 76 inhibits the cable tie 40 from slipping off the cable attachment flange 72. Other types of cable management devices may be secured to the cable attachment flange 72. For example, a barrier strip for dividing cables or bundle of cables supported by the cable tray section 10 may be secured to the cable attachment flange 72, such as by using a fastener (e.g., a screw) to fasten the barrier strip to the cable attachment flange.

Referring to FIGS. 8-11, another embodiment of a cable management fitting is generally indicated at reference numeral 112. This second embodiment 112 is similar to the first embodiment 12, and like components are indicated by corresponding reference numerals. Unlike the first embodiment, the present cable management fitting 112 does not include a latch at the second end of the base 54. Moreover, the cable management fitting 112 does not snap-fit onto the lower flange 34 of the rung 26. Instead, the rung attachment portion 52 is configured to clip (broadly, attach) onto the lower flange 34 by via an interference fit between an interference fit portion, generally indicated at 120, at the second end of the base 54 and the corresponding terminal end of the lower flange portion (e.g., the terminal end of the downstream portion 34B). In the illustrated embodiment, the interference fit portion 120 includes a rib or projection to facilitate the interference fit with the lower flange 34. The cable management fitting 112 also includes a rib 122 on the cable attachment flange 72.

The cable management fitting 112 is attached to the lower flange 34 without the use of an additional fastener, in a manner similar to that of the first cable management fitting 12. The main difference being that the rather than a snap-fit attachment, the rung attachment portion 52 is attached to the lower flange 34 by an interference fit as the second end of the base 54 is pivoted about the hook member 56 toward the lower flange. It is understood that the cable management fitting may be attached to the rung in other ways without the use of an additional fastener.

It will be apparent that modifications and variations are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A cable tray assembly comprising:
   two rails forming sides of the cable tray assembly;
   rungs connected to and extending between the two rails, each rung including a body having upper and lower ends, a lower flange at the lower end of the body, and an upper flange at the upper end of the body; and
   a cable management attachment fitting secured to one of the rungs and including
      a rung attachment portion attached to one of the rungs of the cable tray assembly without the use of an additional fastener, and
      a cable management attachment portion extending from the rung attachment portion and configured to provide a structure to which a cable management device can be secured, wherein the cable management attachment portion includes an arm extending upward from the rung attachment portion, and a cable attachment flange extending laterally outward from an upper end of the arm adjacent the upper flange of the corresponding rung,
   wherein the cable attachment flange extends in a direction away from the upper flange of the corresponding rung.

2. The cable tray assembly set forth in claim 1, wherein the rung attachment portion is attached to the lower flange of the rung by one of a snap-fit and an interference fit.

3. The cable tray assembly set forth in claim 2, wherein the lower flange of the rung includes first and second portions on opposite sides of the body of the rung, wherein the rung attachment portion is attached to the first portion of the lower flange, wherein the arm extends upward from the base adjacent the second portion of the lower flange.

4. The cable tray assembly set forth in claim 3, wherein the rung attachment portion comprises a hook configured to hook onto a terminal edge margin of the first portion of the lower flange.

5. A method of attaching a cable management attachment fitting to a ladder-type cable tray comprising:
   providing a cable management fitting including a rung attachment portion configured to attach to a lower flange of a rung of the ladder-type cable tray without the use of an additional fastener, and a cable management attachment portion extending upward from the rung attachment portion and configured to provide a structure to which a cable management device can be secured, wherein the cable management attachment portion includes an arm extending upward from the rung attachment portion, and a cable attachment flange extending laterally outward from an upper end of the arm, wherein the cable attachment flange and the rung attachment portion extend outward from the arm in opposite directions; and
   attaching the rung attachment portion to the lower flange of the rung of the ladder-type cable tray without the use of an additional fastener, such that the cable management attachment portion is adjacent an upper end of the rung and the cable attachment flange extends in a direction away from the upper flange of the corresponding rung.

6. The method of attaching a cable management attachment fitting to a ladder-type cable tray set forth in claim 5, further comprising:
   securing at least one cable to the cable attachment flange using a cable tie.

7. A cable tray assembly comprising:
   two rails forming sides of the cable tray assembly;
   rungs connected to and extending between the two rails, each rung including a body having upper and lower ends, a lower flange at the lower end of the body having first and second portions on opposite sides of the body, and an upper flange at the upper end of the body; and
   a cable management attachment fitting secured to one of the rungs, the cable management attachment fitting including:
      a base in generally opposing, face-to-face relationship with a lower surface of the lower flange, the base having a first end and a second end,
      a hook at the first end of the base, the hook defining a channel in which the first portion the lower flange of said one of the rungs is received,
      an arm portion extending upward from the second end of the base toward the upper flange of said one of the rungs, and
      a cable attachment flange extending laterally outward from an upper end of the arm portion, wherein the cable attachment flange extends in a direction away from the upper flange of the said one of the rungs.

8. The cable tray assembly set forth in claim 7, wherein a lip extending downward is disposed at a terminal end of the cable attachment flange.

9. The cable tray assembly set forth in claim 7, wherein the base and the cable attachment flange are generally planar.

10. The cable tray assembly set forth in claim 7, wherein the base, the arm portion, and the cable attachment flange are formed from metal.

11. The cable tray assembly set forth in claim 7, wherein the cable attachment flange and the base extend laterally outward from the arm portion in opposite directions.

* * * * *